US006704863B1

(12) United States Patent
Paul et al.

(10) Patent No.: US 6,704,863 B1
(45) Date of Patent: Mar. 9, 2004

(54) LOW-LATENCY DMA HANDLING IN PIPELINED PROCESSORS

(75) Inventors: Somnath Paul, Milpitas, CA (US); Gregory H. Efland, Palo Alto, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/594,219

(22) Filed: Jun. 14, 2000

(Under 37 CFR 1.47)

(51) Int. Cl.[7] ................................. G06F 9/38
(52) U.S. Cl. ..................... 712/244; 710/260
(58) Field of Search ............. 712/244, 40, 41, 712/220; 710/260, 262, 264, 267, 269, 263, 22, 40

(56) References Cited

U.S. PATENT DOCUMENTS

| | | | | |
|---|---|---|---|---|
| 4,293,908 A | * | 10/1981 | Bradley et al. | 710/22 |
| 4,797,853 A | * | 1/1989 | Savage et al. | 710/22 |
| 4,875,160 A | * | 10/1989 | Brown, III | 712/228 |
| 5,055,999 A | * | 10/1991 | Frank et al. | 711/163 |
| 5,113,521 A | * | 5/1992 | McKeen et al. | 714/15 |
| 5,822,578 A | * | 10/1998 | Frank et al. | 712/244 |
| 5,974,522 A | * | 10/1999 | Torng et al. | 712/23 |
| 6,003,129 A | * | 12/1999 | Song et al. | 712/244 |
| 6,061,787 A | * | 5/2000 | Seshan | 712/244 |

* cited by examiner

Primary Examiner—Henry W. H. Tsai
(74) Attorney, Agent, or Firm—Kevin L. Daffer; Conley Rose P.C.

(57) ABSTRACT

A method, system and processor are provided for minimizing latency and loss of processor bandwidth in a pipelined processor when responding to an interrupt. The method advantageously avoids emptying and refilling the processor's instruction pipeline in order to service an interrupt request. Instead, a short sequence of instructions comprising the interrupt response is inserted into the pipeline. Normal pipeline operation stalls while the inserted instructions execute, but since flow is not disrupted the loss in bandwidth is not as great as if the pipeline were flushed. Furthermore, direct insertion of the instructions into the pipeline avoids the need for the processor to save its context and branch to an interrupt service routine in memory; this results in much faster response in servicing the interrupt, thereby reducing latency. In the preferred embodiment, the method applies to a pipelined processor having a RISC (Reduced Instruction Set Computer) architecture, which receives interrupt requests from one or more DMA memory controllers. The instructions inserted into the pipeline compute block address information for a DMA transfer. A system and processor implementing the method are disclosed, based on an enhancement of a conventional RISC processor design, and making use of registers and other existing logic resources within the processor. It is shown that the enhanced processor can respond to DMA interrupts with shorter latency and a smaller reduction in processor bandwidth than if conventional interrupt handling were used.

21 Claims, 7 Drawing Sheets

LOW-LATENCY DMA HANDLING IN PIPELINED PROCESSORS

BACKGROUND OF THE INVENTION

1. Field of the Invention

This invention relates to computer processor operation, and more particularly to a method for optimizing the ability of a pipelined processor to respond to Direct Memory Access (DMA) interrupts. Described herein are means for reducing the time required for the processor to service a DMA request (or other exceptions or interrupts), without adversely impacting instruction flow in the processor's pipeline.

2. Description of the Related Art

Although nominally a computational device, the central processing unit (CPU) in a computing system is typically charged with a variety of other tasks. In addition to strictly computational functions, the CPU may be required to handle input/output from peripheral devices, manage memory, etc. Many of these activities are driven by external events, which may occur randomly with respect to the sequence of operations being carried out by the CPU. It is important that these event-driven functions be performed expediently by the CPU, and with minimal disruption of its computational activities. Polling external inputs to detect whether the event in question has occurred is an obvious, but very inefficient, way of doing this. Polling refers to the option of simply adding instructions to the main program sequence of the CPU to periodically test all of the event-driven inputs. However, since polling diverts the CPU from its main computational task, it presents a dilemma. If polling is done too infrequently, latency in responding to external events may become intolerable. On the other hand, polling too frequently, while improving the ability of the CPU to respond to external events, may add excessive overhead to the computational task.

Interrupts provide a way out of this dilemma. An interrupt is a special type of input to the CPU. When an interrupt occurs, the CPU temporarily suspends whatever it is doing and executes special interrupt-related instructions in response to the external event responsible for the interrupt. The interrupt-related instructions are typically referred to as an Interrupt Service Routine (ISR), and may perform some function requested by an external device. For example, an interrupt from a keyboard can momentarily divert the processor from executing main program instructions to accept a typed character. An ISR is typically executed as promptly as possible after the interrupt is received. Prior to entering the ISR, the CPU makes preparations so that, upon completion of the ISR, it can resume the process that was suspended when the interrupt occurred. This may involve saving the current context (i.e., program counter, status register, etc.). The advantage of using interrupts is that no time is wasted in polling the external inputs, since the CPU is never diverted from its computational activities until an interrupt occurs. Furthermore, the worst-case response time to an external event is no longer based on the polling interval. The interval between the occurrence of an interrupt and the completion of the ISR (known as the interrupt latency) is now dependent on shorter times, such as the time required for the CPU to save the context.

Figure 1:
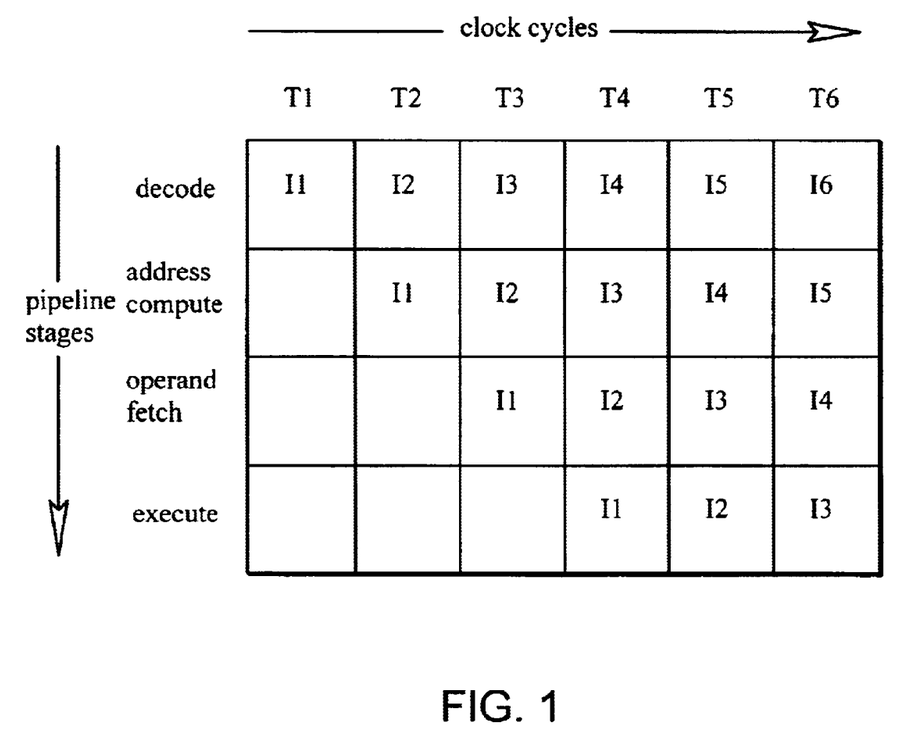
FIG. 1 illustrates the operation of a typical instruction pipeline.

An architectural feature of many modern CPUs is the instruction pipeline. A pipeline consists of a sequence of stages through which instructions pass as they are executed, with partial processing of an instruction being performed in each stage. Each instruction typically comprises an operator and one or more operands. The operator represents a code designating the particular operation to be performed (e.g., MOVE, ADD, etc.), and the operand denotes an address or data upon which the operation is to be performed. Execution of the instruction requires several steps; e.g., the instruction must be decoded, the addresses of the operands computed, the operands fetched, and the operation executed. In a non-pipelined processor, only one instruction is processed at a time. Therefore, the instruction rate is based on the time required to perform all of these separate steps. However, in a pipelined processor, the steps are performed concurrently on multiple instructions, as they advance through the pipeline. An example of this is shown in FIG. 1, for a four-stage pipeline. The processing sequence for each instruction is from top to bottom. Each stage of processing is assumed to require one clock cycle, and the clock cycles are represented as time steps T1–T6. Instruction I1 enters the first stage of the pipeline at time T1, where it is decoded. One clock cycle later, at time T2, instruction I1 advances to the second stage of the pipeline, where the addresses of its operands are computed; simultaneously, a second instruction I2 enters the first stage of the pipeline to be decoded. This process continues to time T4, where instruction I1 is finally executed. By time T5, instruction I1 has fallen out of the pipeline and instruction I2 is executed. Note that once the pipeline is full, an instruction emerges from the pipeline for each clock cycle—four times faster than if each instruction had to be completed before processing the next one. In effect, the pipeline allows multiple instructions to be processed concurrently, and greatly enhances the bandwidth (i.e., instructions per second) of the CPU.

To operate efficiently, a pipeline must remain full to the extent possible. Anything that disrupts the flow of instructions into and out of the pipeline negates its benefits and diminishes bandwidth. In particular, if it becomes necessary to empty and refill the pipeline very frequently, performance may begin to approach that of a non-pipelined processor. This can potentially occur with an interrupt. As stated above, it is usually desirable to allow an interrupt to preempt the processor. To promptly respond to an interrupt, a pipelined processor typically discards unexecuted instructions from its pipeline, and then refills the pipeline as quickly as possible with the instructions required to service the interrupt (i.e., the ISR). After servicing the interrupt, the pipeline has to be refilled with the main program instructions that were pending when the interrupt took place. Obviously, emptying and refilling the pipeline reduces processor bandwidth. Moreover, the time required to refill the pipeline prior to executing the ISR adds to the interrupt latency.

Direct Memory Access (DMA) transfers are a type of external event capable of interrupting a CPU. A DMA transfer is typically used to move a large amount of data into or out of memory (e.g., when an image file is read from a hard disk into memory). It may be inefficient for the CPU to directly transfer blocks of data, so a special DMA memory controller typically manages the transaction. To initiate a DMA transfer, the controller interrupts the CPU. In response, the CPU gives the controller a few key parameters, such as a target address, size of the data block, etc., and allows it to carry out the data transfer. Although the DMA controller relieves the processor of having to oversee the mass data transfer, the DMA interrupt still disrupts the instruction pipeline, as described in the preceding paragraph, resulting in a loss of efficiency. In systems in which there is a great deal of DMA activity, the impact on latency and bandwidth may be significant. Efficient handling of DMA interrupts may therefore be an important factor in overall system performance in applications such as graphics processing, for example.

For a high-performance pipelined CPU, it would be desirable to avoid the above-mentioned disadvantages associated with responding to a DMA interrupt. It would be beneficial in particular, to minimize the loss in CPU bandwidth and the increased interrupt latency that result from having to empty and refill the pipeline to service the interrupt. It would be especially desirable if this could be accomplished in a straightforward manner, without extensively modifying the CPU.

SUMMARY OF THE INVENTION

The problems outlined above are in large part solved by a method for minimizing latency and loss of processor bandwidth in a pipelined processor when responding to an interrupt. The method advantageously avoids emptying and refilling the processor's instruction pipeline in order to service an interrupt request. Instead, a short sequence of instructions comprising the interrupt response is inserted into the pipeline. Normal pipeline operation stalls while the inserted instructions execute, but since flow is not disrupted the loss in bandwidth is not as great as if the pipeline were flushed. Furthermore, direct insertion of the instructions into the pipeline avoids the need for the processor to save its context and branch to an interrupt service routine in memory; this results in much faster response in servicing the interrupt, thereby reducing latency.

In a preferred embodiment, the method applies to a pipelined processor having a RISC architecture. A RISC (Reduced Instruction Set Computer) is a type of processor that is designed to perform a smaller number of types of computer instructions so that it can operate at a higher speed. In an embodiment, the processor receives interrupt requests from one or more DMA memory controllers, and the instructions inserted into the pipeline compute block address information for a DMA transfer.

A method is presented herein for servicing an interrupt in a pipelined processor, including generating one or more interrupt-related instructions within the processor in response to the interrupt and inserting the interrupt-related instructions into the pipeline of the processor for execution. These interrupt-related instructions generated within the processor may constitute the entire interrupt service routine, or alternatively, a portion of the interrupt service routine. Main program instructions which may be present in the instruction pipeline of the processor prior to receiving the interrupt are retained when the interrupt-related instructions are inserted. Normal operation of the pipeline may be resumed subsequent to execution of the interrupt-related instructions, beginning with execution of any main program instructions retained in the pipeline at the time of the interrupt.

In an embodiment, the interrupt-related instructions compute address information for a DMA request from a memory channel. In such embodiments, the interrupt-related instructions may send the contents of an address register to a data bus, compute a new address, and then store that address in the address register. A count register may also be decremented each time an interrupt is serviced, to avoid transferring more than a predetermined maximum number of data blocks. The DMA request in an embodiment is a block address request (BARq) from a memory channel, and is assigned the highest available interrupt priority. Alternatively, the request may be one of a plurality of BARq interrupts, each of which is assigned a different priority higher than that of other types of interrupt.

In another embodiment of the method for servicing an interrupt in a pipelined processor, a stage of the pipeline is frozen in response to the interrupt, and one or more interrupt-related instructions are inserted into a stage of the pipeline succeeding the frozen stage. In this embodiment, main program instructions may pass through the pipeline to be executed, prior to the processor's receiving the interrupt. While the pipeline is frozen, each stage prior in the execution sequence to the stage into which the interrupt-related instructions are inserted may therefore retain a main program instruction present in the stage at the time the interrupt was detected. Subsequent to execution of the interrupt-related instructions, execution of the retained main program instructions may resume.

A processor is also described herein, where the processor includes interrupt handling circuitry adapted to generate one or more interrupt-related instructions in response to an interrupt signal, and insert the interrupt-related instructions into a pipeline of the processor for execution. These interrupt-related instructions may include all instructions used to service the interrupt associated with the interrupt signal, or alternatively, may include some of the instructions used to service the interrupt. In an embodiment, the interrupt handling circuitry recognizes the interrupt signal (and distinguishes it from other types of interrupts), and transmits a stall signal to a stage of the pipeline preceding the stage into which the generated interrupt-related instruction is inserted, which freezes the pipeline above the insertion point. The interrupt handling circuitry may remove the stall signal after insertion of the last interrupt-related instruction. In an embodiment, the interrupt handling circuitry receives the interrupt signal from a memory controller, which generates the interrupt as a DMA request.

A processor-based system is also disclosed, consisting of a pipelined processor as described above, together with a memory controller that transmits the interrupt signal to the processor. The interrupt signal in a preferred embodiment of the system is a DMA request, and the interrupt-related instructions send an address to a memory system in response to the interrupt signal. The memory controller in this embodiment may issue multiple DMA requests for different memory channels. Each of the DMA requests may be assigned a different priority, and DMA requests preferably have a higher priority than other interrupts. The memory controller may receive an acknowledge signal from the interrupt handling circuitry for each DMA request.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

A preferred embodiment of the method and system disclosed herein comprises a 32-bit RISC-based processor with a 3-stage instruction pipeline. Typically, while one instruction executes in the final stage of such a pipeline, its successor is being decoded in the previous stage, and a third instruction is being fetched into the pipeline from memory. In such an embodiment, the processor may operate in a graphics-intensive application in which it is interfaced to a multi-bank video memory and a DMA memory controller. (Use of the present system and method is not restricted to video memory, or to a multibank memory configuration, however.) In this context, DMA requests from the memory controller (referred to as Block Address Requests, or BARq) interrupt the processor. Upon receipt of a BARq interrupt, the processor responds by initializing the video memory with a block starting address representing the point in the video memory at which the next DMA transfer will begin. Using the starting address supplied by the processor, the memory controller generates the rest of the addresses for the block memory transfer independently of the processor. The processor stores the starting address for the current DMA transfer, as well as the block size used to calculate starting address for the next DMA transfer; it also logs the total number of transfers in a DMA event counter, so the user can be notified when the count reaches a certain value. These three values comprise the block address information required for the processor to interact with the memory controller.

A conventional way of dealing with the BARq interrupt in a system such as that described above would be for the processor to branch to an interrupt service routine (ISR). The ISR would contain instructions to generate the block address information and to initialize the video memory with the starting address for the block transfer. In this context, the interrupt latency may be defined as the number of clock cycles between the time the BARq interrupt is asserted and the time the starting address for the block transfer is written to the video memory. However, this approach is costly in terms of latency and bandwidth. Because of the 3-stage pipeline, a 3-clock overhead is imposed before the branch to the ISR is executed. An additional 6 clock cycles would be consumed in the ISR itself—2 clock cycles to write the starting address of the block transfer to the video memory, 1 cycle to decrement the DMA count register, and 3 more cycles to restore the contents of the pipeline prior to the interrupt. Thus, the processor would suffer a loss of at least 9 clock cycles in bandwidth. Pipeline stalls, instructions that require more than one clock cycle for execution, etc. may increase the number of lost clock cycles. Similarly, the interrupt latency would be at least 6 clock cycles—1 clock cycle to complete the current instruction, 3 more clock cycles to begin execution of the ISR, and 2 clock cycles to write the starting address of the block transfer to video memory. The bandwidth loss and latency both worsen with multiple DMA channels. In an embodiment, the processor interfaces to three blocks of video memory.

One possible alternative to the approach outlined above involves the use of ancillary circuitry, the express purpose of which is to handle BARq interrupts and generate the required block address information. The requisite functions could be implemented using, for example, programmable logic arrays (PLAs). BARq interrupts would then be intercepted and dealt with by the special circuitry, independently of the processor. This would certainly improve latency and processor bandwidth, as compared to using interrupts. However, this solution involves added cost and complexity, as well as loss of board space. Furthermore, the processor relinquishes direct control of the memory.

Figure 2A:
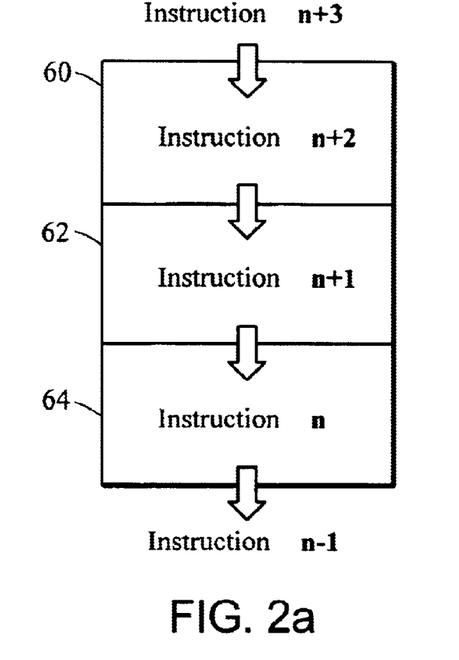
FIG. 2 compares the normal operation of the instruction pipeline to its operation in response to a DMA interrupt, using the present method.
Figure 2B:
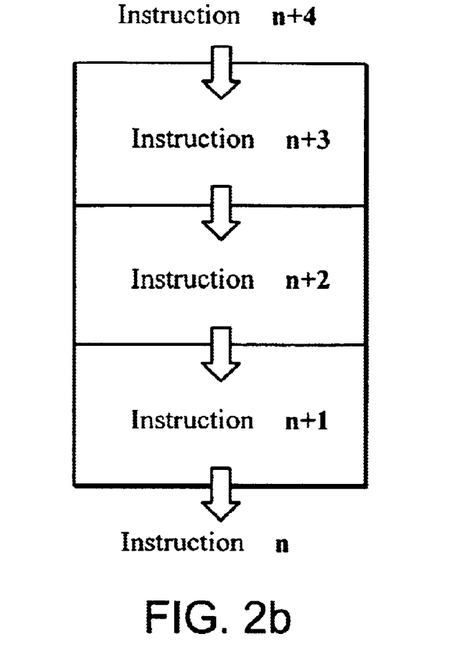

Advantageously, the method disclosed herein provides low-latency/high-bandwidth DMA interrupt processing, internal to the microprocessor. In response to a DMA interrupt, interrupt-related instructions are inserted into the pipeline by interrupt handling circuitry within the processor. This may be accomplished without displacing the main program instructions in the pipeline. FIGS. 2a and 2b illustrate the operation of an exemplary 3-stage instruction pipeline. Each stage 60, 62 and 64 of the pipeline performs one of a sequence of operations involved in the execution of an instruction. The arrows indicate the propagation of instructions through the pipeline stages, and the instruction numbering reflects the order in which they appear in the main program. In FIG. 2a, instruction n+3 is about to enter the pipeline at stage 60 and instruction n is about to be executed, while instruction n−1 has just executed and exited stage 64 of the pipeline. Assuming that each stage of processing in the pipeline requires one clock cycle (e.g., as in a RISC processor), FIG. 2b shows the pipeline one clock cycle later. In FIG. 2b, the instructions have all advanced one stage and instruction n+1 is about to be executed.

Figure 2C:
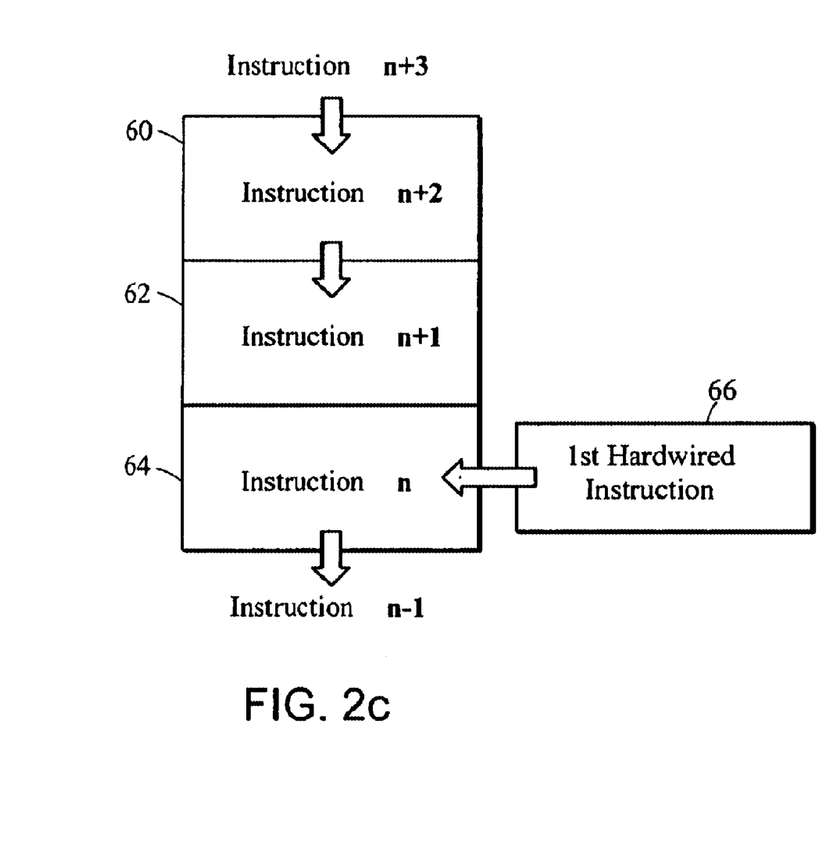
Figure 2D:
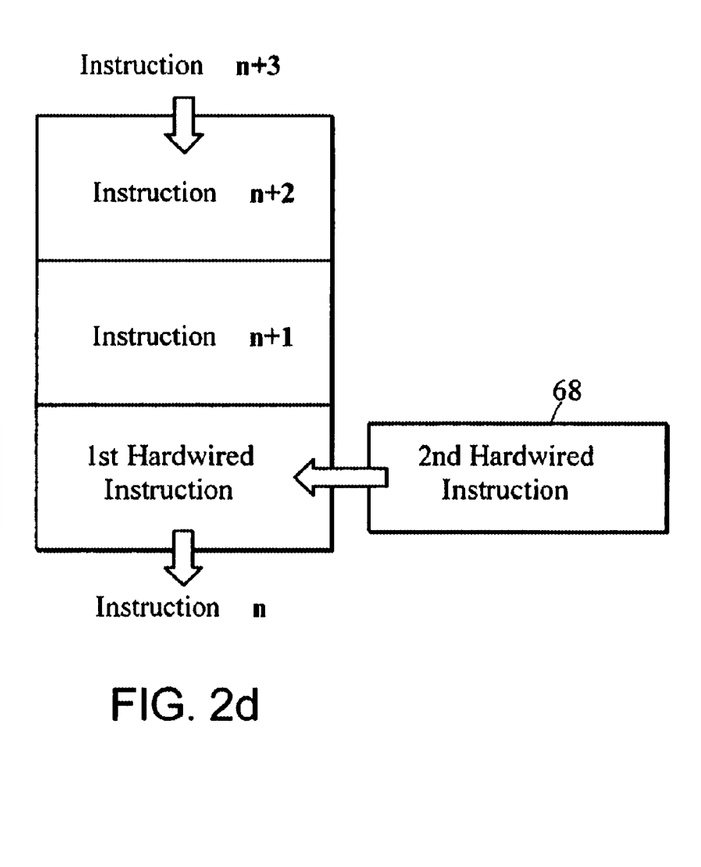
Figure 2E:
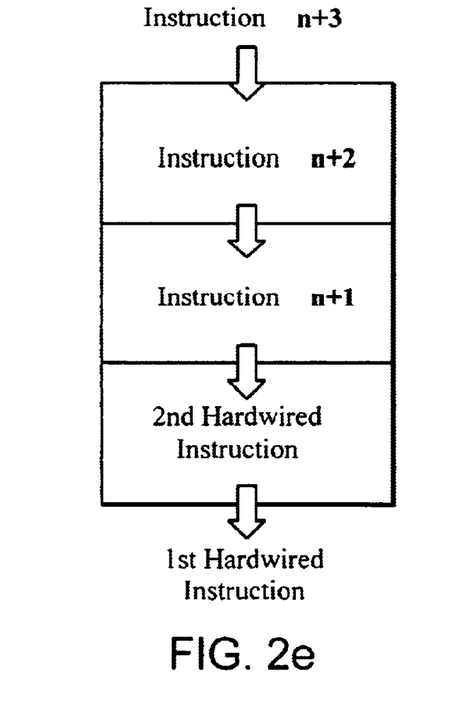
Figure 2F:
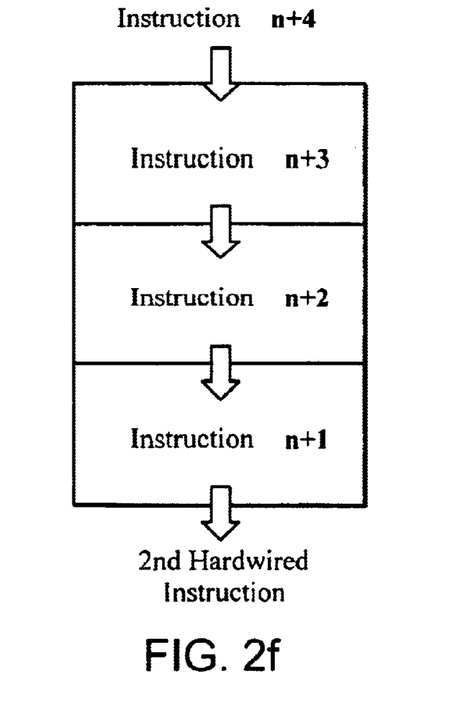

FIGS. 2c–2f illustrate the use of this pipeline in an embodiment of the method disclosed herein. In this example, it is further assumed that just 2 instructions are necessary to service the DMA interrupt. Rather than fetch these instructions from a location in memory, as would be done in conventional interrupt processing, the present method employs interrupt handling circuitry to generate these instructions within the processor; such instructions may be referred to as "hardwired". Because they do not have to be fetched from external memory, hardwired instructions may be directly decoded and executed, thus reducing latency in servicing the interrupt. The hardwired instructions may be introduced directly into the instruction pipeline at a predetermined insertion point (i.e., at one of the pipeline stages). FIG. 2c shows the first of the 2 instructions 66 being inserted into the last stage 64 of the pipeline. According to the method, the pipeline stages above the insertion point are stalled (i.e., the instructions in those stages do not advance further down the pipeline with each clock cycle). Instead, each clock cycle causes the next hardwired instruction to be fed into the insertion point, while the instructions in the pipeline stages below the insertion point continue to advance. The series of events can be understood by referring to FIGS. 2c–2f. In FIG. 2c, instruction n is ready to execute, while the first hardwired instruction is about to be inserted into the last pipeline stage 64. One clock cycle later, in FIG. 2d, instruction n has completed and the firs hardwired instruction is ready to execute; meanwhile, the second hardwired instruction is about to enter the pipeline. Note that the instructions above the insertion point (i.e., instructions n+1, n+2, etc.) remain frozen. In FIG. 2e, the first hardwired instruction has completed and the second is about to execute. Also, since there are no more hardwired instructions to be inserted into the pipeline, normal operation of the pipeline is about to resume. In FIG. 2f, the second hardwired instruction has completed and the pipeline has advanced, so main program instruction n+1 is next to execute.

Figure 3:
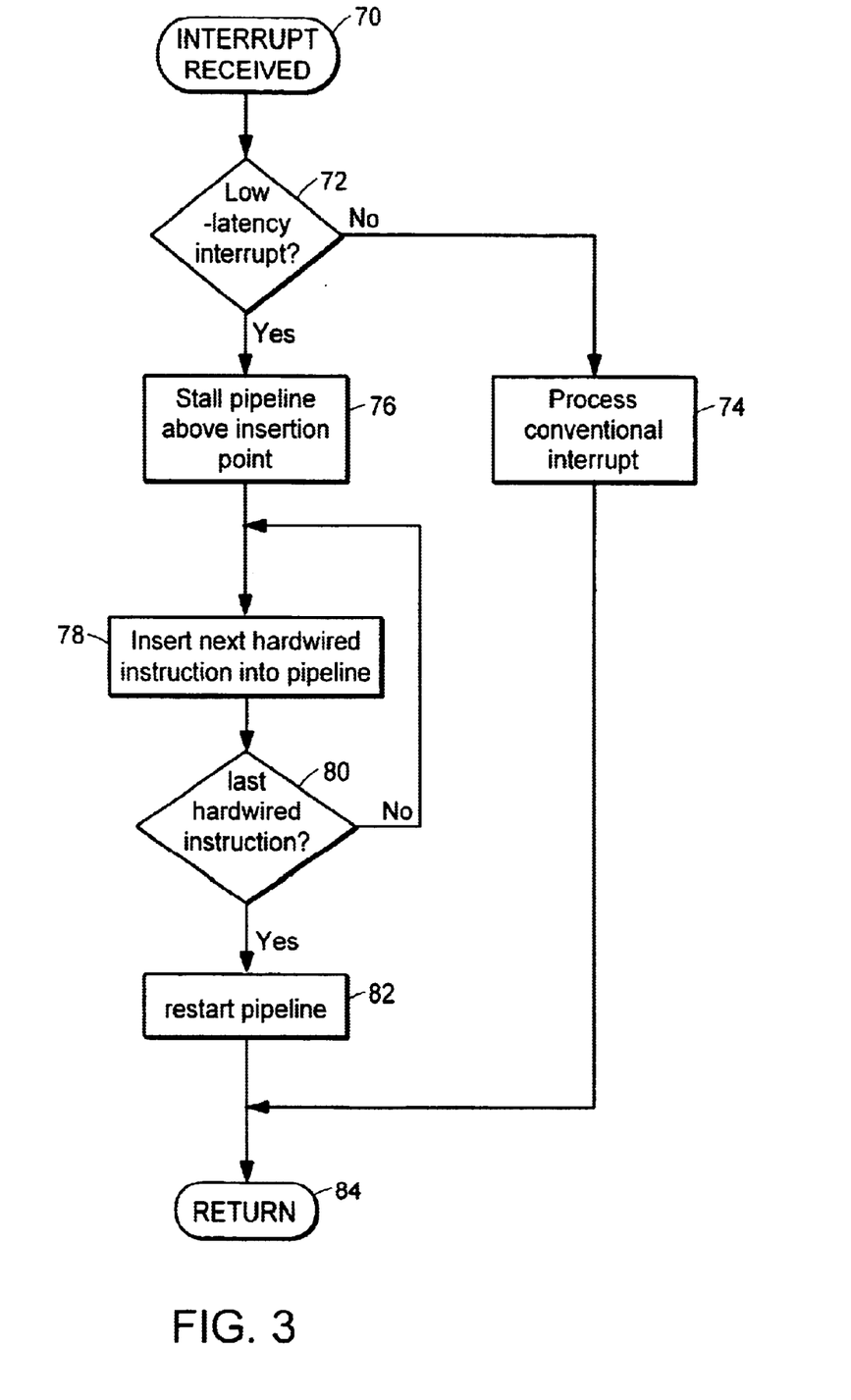
FIG. 3 is a flowchart describing the operation of the interrupt handling circuitry in an embodiment of the present method.

FIG. 3 contains a flowchart for an embodiment of the method disclosed herein. This method may be performed by interrupt handling circuitry within the processor. When an interrupt is received 70, it is first determined 72 whether it is a low-latency interrupt for which hardwired instructions are available. If not, it is handled 74 by the conventional interrupt processing mechanism of the processor. Otherwise, the pipeline is stalled 76 at the insertion point and the first of the hardwired interrupt-related instructions is inserted 78 into the pipeline. Thereafter, each clock cycle causes execution of the previously-inserted instruction and insertion of the next, until all of the hardwired instructions have executed 80. At this point, the pipeline is restarted 82, so the pending main program instructions can be processed, and normal program execution is resumed 84.

In an embodiment of the method dealing with video memory DMA transfers, three storage registers may be used for the block address information: a 16-bit size register in which to store the DMA block size, another 16-bit count register with which to count the total number of DMA transfers, and a 32-bit next address register in which to store the starting address of the next DMA transfer. All three storage registers may be implemented using standard registers in the processor, or alternatively, these values may be stored in an on-chip memory array. Additional interrupt handling circuitry included within the processor may be used to recognize and implement special handling of BARq interrupts. In an embodiment, two signals are generated by the processor: a "BARq acknowledge" (barqack) signal when a BARq is executed, and a "BARq zero" (barq_cntz) signal when a predefined maximum number of blocks has been transferred. These signals are used to interface to the video memory banks and DMA memory controller. This pair of signals is duplicated for each of the three blocks of video memory. Thus, for example, "barqack1" is the BARq acknowledge signal corresponding to video memory bank 1. In this embodiment, the DMA interrupt service routine has to update the block address information; in a preferred pipelined 32-bit RISC processor, this can be accomplished using the following 2 instructions:

(1) Send the contents of the 32-bit next address register to the data bus, and add the 16-bit size register to the current contents of the next address register.

(2) Decrement the count register by 1.

Figure 4:
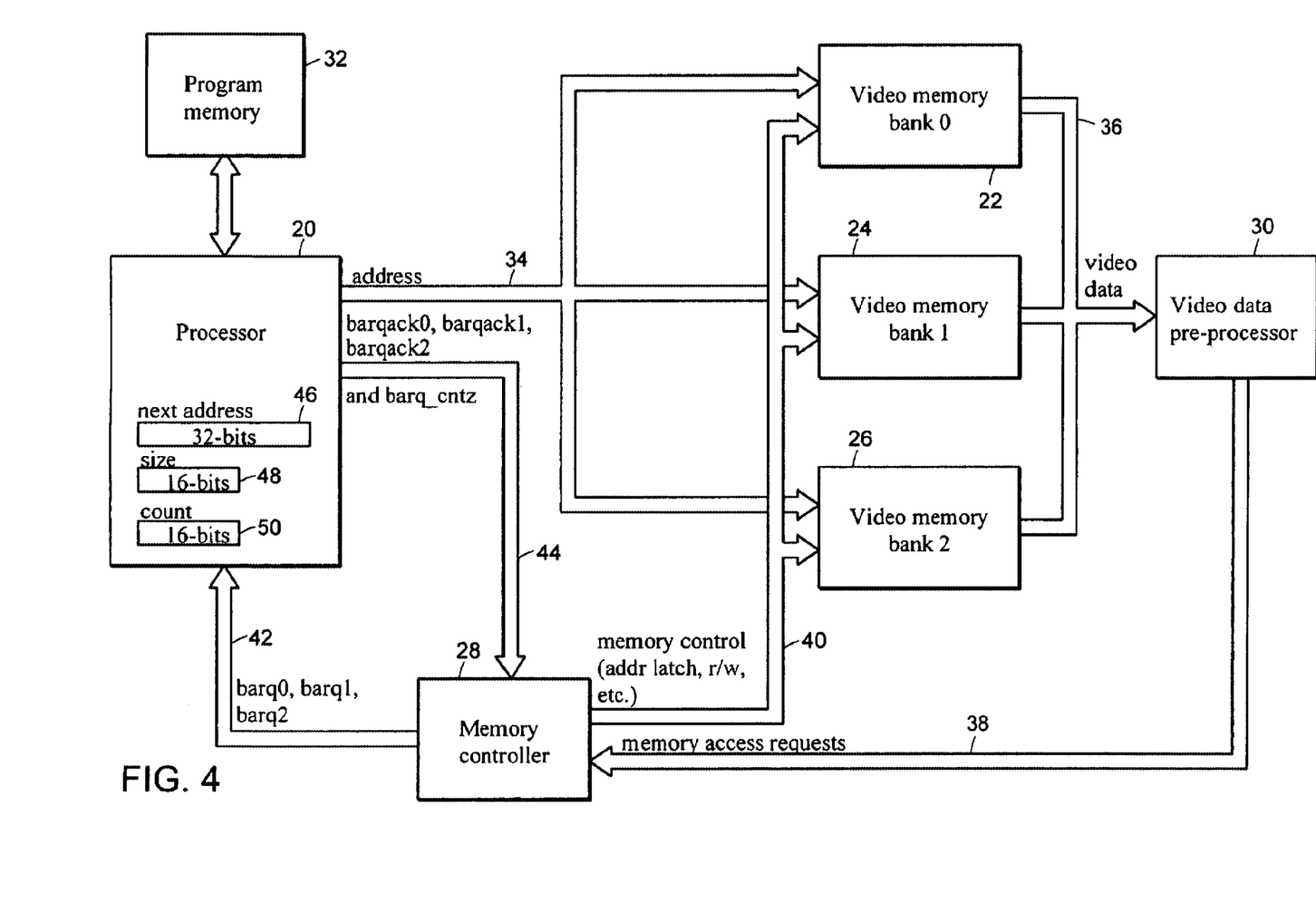
FIG. 4 is a block diagram illustrating a preferred embodiment of a system employing the present method.

FIG. 4 is a block diagram of a preferred embodiment of the method disclosed herein, illustrating the relationship between a pipelined processor 20, the DMA memory controller 28 and the three banks of video memory 22, 24, and 26 in a preferred embodiment. Also shown in FIG. 4 are a video data pre-processor 30, and a program memory 32 associated with processor 20. A BARq interrupt may be initiated by a memory access request from video data pre-processor 30, which interfaces to the banks of video memory over bus 36. The memory access request associated with the BARq interrupt is sent to memory controller 28, which interrupts processor 20 with a barq0, barq1 or barq2 DMA interrupt request, depending on which video bank has been selected for the DMA transfer. The processor, according to the method described herein, prepares the block address information for the request and writes the starting address for the transfer to the appropriate bank of video memory 22, 24 or 26, using bus 34. Processor 20 may then acknowledge the request by asserting barqack0, barqack1 or barqack2 over bus 44. The acknowledge signal may be used to latch the starting address. Once the BARq interrupt has been acknowledged, memory controller 28 handles the DMA transfer, using memory control bus 40.

As described above, the 32-bit next address register 46 in the processor 20 holds the starting address for the next DMA transfer, and 16-bit size register 48 contains the DMA block size. The starting address for the next transfer is the sum of the previous starting address and the block size. The first of two hardwired instructions places the contents of next address register 46 on the data bus, causing the current starting address for the DMA transfer to be written to the appropriate block of video; it then adds the contents of size register 48 to next address register 46, updating the starting address for the next block transfer. A third 16-bit count register 50 is used to count the number of BARq accesses. The second of the hardwired instructions decrements this register by 1. When count register 50 has decremented all the way to zero, the barq_cntz signal becomes active, notifying memory controller 28 that the maximum block count has been reached.

Figure 5:
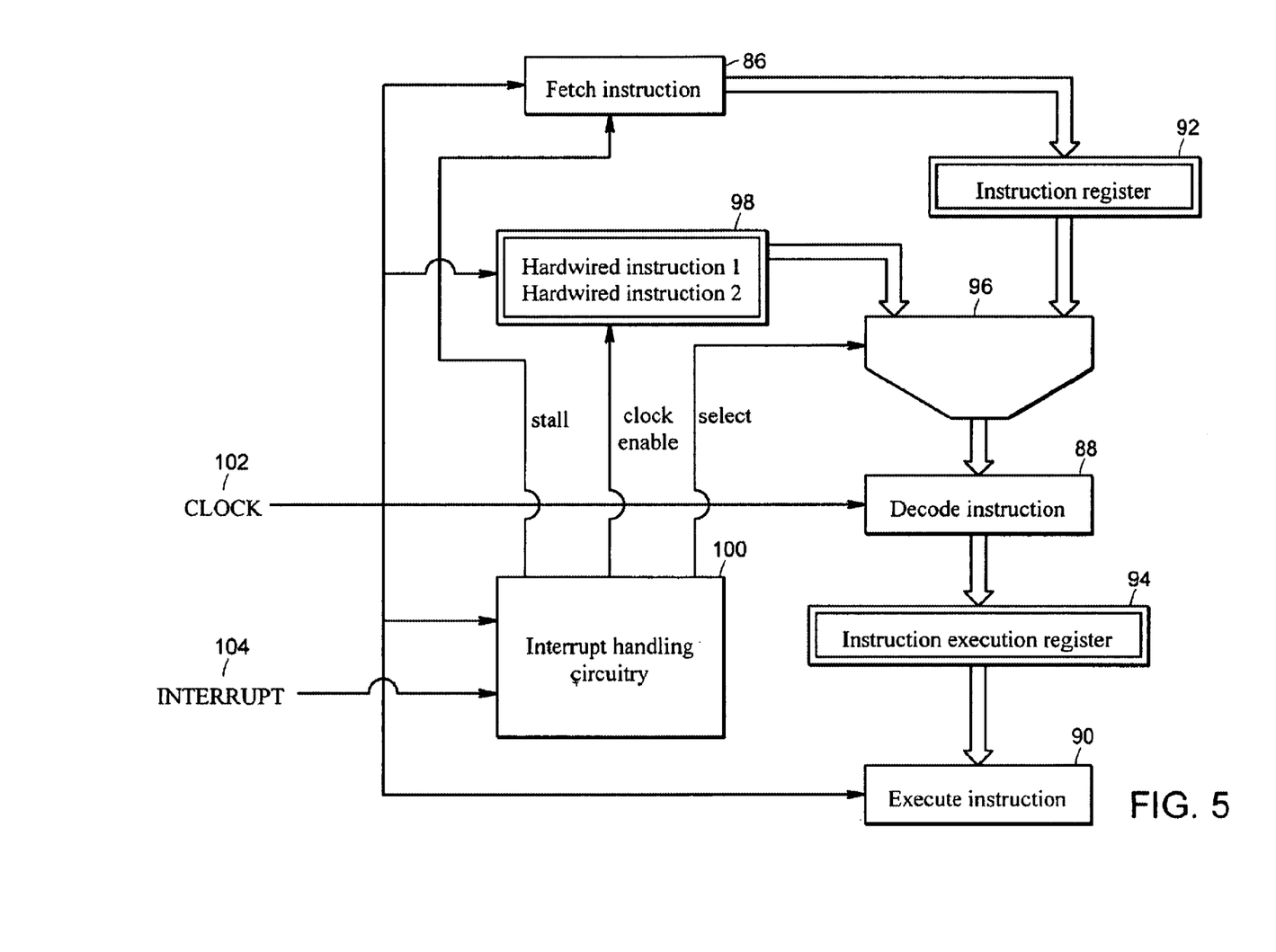
FIG. 5 contains a block diagram illustrating the interaction of interrupt-handling circuitry with an exemplary pipeline.

The interaction of interrupt-handling circuitry with an exemplary pipeline as disclosed herein is shown in FIG. 5. This example depicts a 3-stage pipeline in which instructions are fetched 86, decoded 88 and then executed 90, while registers 92 and 94 contain the intermediate pipeline results. A multiplexer 96 selects either the main program instruction in the instruction register 92 or the hardwired instruction at the top of the 2-instruction (in this embodiment) stack 98 to enter the decode stage 88 of the pipeline. The interrupt handling circuitry 100 for recognizing the DMA interrupt 104 and managing the pipeline is also shown. The clock 102 is distributed to pipeline stages 86, 88 and 90, as well as the interrupt handling circuitry 100 and hardwired instruction stack 98. When the interrupt handling circuitry detects that interrupt 104 is a BARq DMA request, it stalls the pipeline by sending a stall signal to fetch stage 86, enables clocking of the hardwired instruction stack, and programs the multiplexer 96 to connect the hardwired instruction stack to the insertion point (decode stage 88) of the pipeline. The first clock cycle after the interrupt results in the execution of the main program instruction currently in execution register 94. However, since the pipeline is stalled, the fetch of the next main program instruction 86 is suspended. Instead, the next instruction to be decoded 88 is selected from the top of the hardwired instruction stack 98 by multiplexer 96. At the end of the clock cycle, the decoded hardwired instruction appears in the execution register 94, and the second hardwired instruction is clocked to the top of the stack. The second clock cycle after the interrupt causes the first hardwired instruction to be executed and the second hardwired instruction to be decoded, following which, the interrupt handling circuitry removes the stall condition on the main program instruction fetch 86 and redirects the multiplexer 96 to accept input from the instruction register 92. This restarts the pipeline. The third clock cycle after the interrupt causes the execution of the second hardwired instruction presently in the execution register 94, the decode of the main program instruction presently in the instruction register 92, and the fetch of a new main program instruction 86 into the pipeline.

Figure 6:
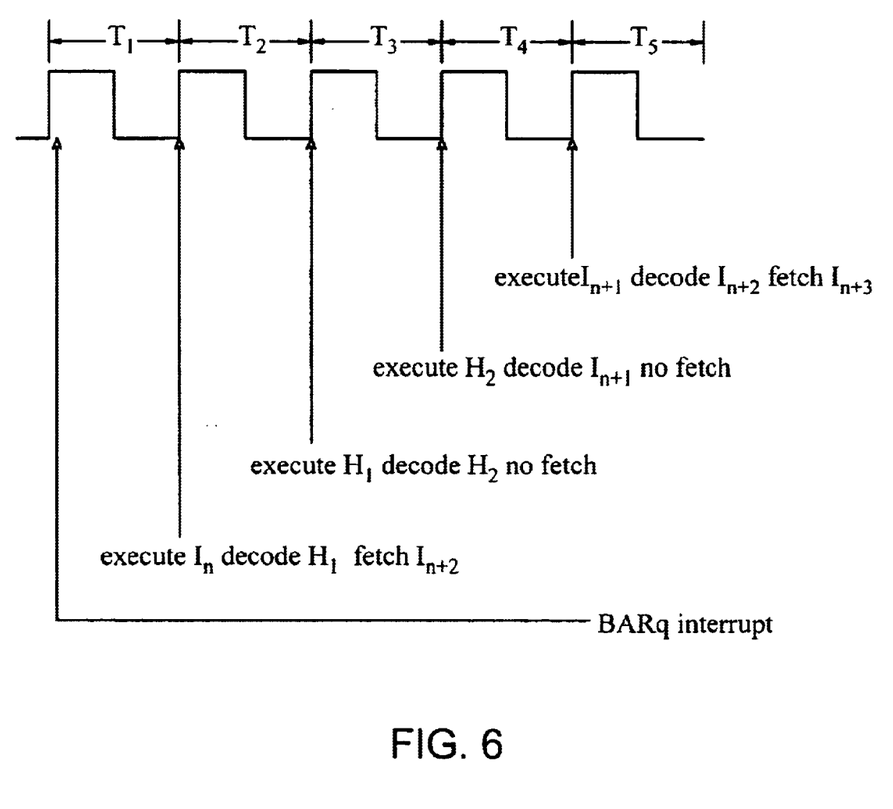
FIG. 6 contains a timing diagram describing the sequence of events in the operation of the hardware implementation of FIG. 5.

The sequence of events described above is shown in FIG. 6 in the form of a timing diagram spanning 5 clock cycles, $T_1$–$T_5$. For convenience, all logic is assumed to be synchronous with the rising edge of the clock. The arrows and accompanying text in FIG. 6 indicate the occurrence of events relative to the clock. In this example, "$H_m$" denotes the "$m^{th}$ hardwired instruction", while "$I_k$" denotes the "$k^{th}$ instruction" from the main program. Arbitrarily, it is assumed that instruction $I_n$ is in the execution stage of the pipeline at the end of clock cycle $T_1$; likewise, $I_{n-1}$ is in the instruction register and $I_{n+2}$ is the next instruction to be fetched. Referring to FIG. 6, the BARq interrupt occurs just after the start of cycle $T_1$, while the first hardwired instruction $H_1$ executes during cycle $T_3$. Assuming $I_n$ and $H_1$ are each executed in one cycle, this results in a worst-case latency of 2 clock cycles. Also, since $I_n$ executes in clock cycle $T_2$, and $I_{n+1}$ executes when the pipeline is restarted in clock cycle $T_5$, the loss in processor bandwidth is only 2 clock cycles. Direct insertion of the two instructions into the pipeline avoids the 6 clock cycle latency associated with conventional interrupt processing; as a result, the worst-case interrupt latency is just 2 clock cycles—1 clock cycle for the currently-executing instruction to complete, and 1 cycle for execution of the instruction which writes the starting address to the video memory. Furthermore, with the new method, only 2 cycles of processor bandwidth are lost, as opposed to 9 cycles with conventional interrupt processing.

Other types of interrupts may be handled by the processor according to this method in the conventional way (i.e., when an interrupt occurs, the processor saves the current context [program counter and status] and replaces the contents of the instruction pipeline with the beginning instructions of the interrupt service routine). As previously discussed, conventional interrupt processing has a negative impact on latency and bandwidth, but for other external events this loss in performance may be less critical than with DMA transfers (particularly, transfers to video, or other high-speed memory). To maximize throughput, BARq interrupts may be assigned the highest priority in the ARC100, with the exception of RESET. In order to resolve collisions between simultaneous requests, the BARq interrupts are preferably prioritized. In an embodiment, barq2 has the highest priority, followed by barq1 and barq0; however, a BARq cannot interrupt another BARq being serviced.

Since the present method makes use of the internal registers and computational resources of the processor, its implementation requires very little additional circuitry. Therefore, the method described herein is believed to be applicable to any pipelined processor. Furthermore, although an exemplary embodiment of the method relates to video memory, it should be clear that the principles described herein are applicable to any high-speed multi-dimensional (or single-dimensional) memory. As discussed in the preferred embodiment, latency and bandwidth loss associated with processing DMA interrupts are reduced by this technique. However, the technique could also be applied to other types of exceptions. Consideration of the relative latencies involved indicates that the present method would generally be advantageous as long as the number of instructions required to service the interrupt is comparable to or smaller than the length of the pipeline.

It will be appreciated to those skilled in the art having the benefit of this disclosure that the embodiments described are believed applicable in other variants. For example, details such as the number of stages in the instruction pipeline, the number of bits in the processor, or the number of instructions inserted into the pipeline may vary. Similarly, the principles described herein could quite easily be applied to achieve low-latency processing of high-speed interrupts other than DMA. Such other high-speed interrupts may arise in applications for which a processor interacts with a device having its own dedicated controller, e.g., a microcontroller, or control logic circuitry. The method would also be advantageous in situations in which the hardwired instructions accomplished something other than address computation. For example, the hardwired instructions in the interrupt service routine might be used to read the system clock in an application requiring precise timing of external events. Furthermore, the method may be advantageously applied in cases in which the pipeline throughput is less than one instruction per cycle. This may be the case, for example, when a pipeline stalls during a slow memory access. Accordingly, the specification and drawings are to be regarded in an illustrative rather than a restrictive sense as to possibly numerous architectures, circuitry, and methodologies which fall within the spirit and scope of the present invention.

What is claimed is:

1. A method for servicing an interrupt in a pipelined processor, comprising:

generating one or more interrupt-related instructions within the processor in response to the interrupt; and inserting the interrupt-related instructions directly into only the last stage of a pipeline of the processor for execution and not into the preceding fetch stage of the pipe, wherein the interrupt-related instructions generated within the processor comprise all instructions used to service the interrupt.

2. The method as recited in claim 1, further comprising executing main program instructions in the pipeline prior to receiving the interrupt, and wherein said inserting the interrupt-related instructions comprises retaining one or more main program instructions in the pipeline.

3. The method as recited in claim 2, further comprising resuming execution of the retained main program instructions subsequent to execution of the interrupt-related instructions.

4. The method as recited in claim 1, wherein the interrupt-related instructions compute address information for a direct memory access (DMA) request from a memory channel.

5. The method as recited in claim 4, wherein the interrupt-related instructions comprise sending the contents of an address register to a data bus, computing a new address and storing the new address in the address register.

6. The method as recited in claim 5, wherein the interrupt-related instructions further comprise decrementing a count register each time an interrupt is serviced.

7. The method as recited in claim 4, wherein the DMA request is a block address request (BARq) from the memory channel.

8. The method as recited in claim 7, wherein the BARq is assigned the highest available interrupt priority.

9. The method as recited in claim 7, wherein the interrupt is one of a plurality of BARq interrupts, each of which is assigned a different priority higher than that of other types of interrupt.

10. A method for servicing an interrupt in a pipelined processor, comprising:

freezing a fetch stage of a pipeline of the processor in response to the interrupt; and inserting one or more interrupt-related instructions into only an execution stage of the pipeline succeeding the frozen fetch stage and into the fetch stage.

11. The method as recited in claim 10, further comprising executing main program instructions in the pipeline prior to receiving the interrupt, and wherein said freezing a stage comprises retaining a main program instruction in the stage during said inserting.

12. The method as recited in claim 11, further comprising resuming execution of the retained main program instruction subsequent to execution of the interrupt-related instructions.

13. A processor, comprising interrupt handling circuitry adapted to generate one or more interrupt-related instructions in response to an interrupt signal and insert the interrupt-related instructions directly into the last stage of a pipeline of the processor for execution and not into the preceding fetch stage of the pipe line, wherein the generated interrupt-related instructions comprise all instructions used to service the interrupt associated with the interrupt signal.

14. The processor as recited in claim 13, wherein the processor has a RISC architecture.

15. The processor as recited in claim 13, wherein the processor is a megacell in a standard cell logic library.

16. The processor as recited in claim 13, wherein the interrupt handling circuitry is further adapted to:
receive the interrupt signal; and
transmit a stall signal to the fetch stage of the pipeline preceding the last stage into which the generated interrupt-related instruction is inserted.

17. The processor as recited in claim 16, wherein the interrupt handling circuitry is adapted to receive the interrupt signal from a memory controller, and the interrupt is a DMA request.

18. The processor as recited in claim 16, wherein the interrupt handling circuitry is further adapted to remove the stall signal after insertion of the last interrupt-related instruction.

19. A method for servicing an interrupt in a pipelined processor, comprising:
executing main program instructions in a pipeline of the processor prior to receiving the interrupt;
generating one or more interrupt-related instructions within the processor in response to the interrupt; and
inserting the interrupt-related instructions directly into only the last stage of the pipeline for execution, wherein inserting the interrupt-related instructions comprises retaining one or more main program instructions in the pipeline that precede the last stage.

20. The method as recited in claim 19, further comprising resuming execution of the retained main program instructions subsequent to execution of the interrupt-related instructions.

21. The method as recited in claim 19, wherein the interrupt-related instructions compute address information for a direct memory access (DMA) request from a memory channel.

* * * * *

UNITED STATES PATENT AND TRADEMARK OFFICE
CERTIFICATE OF CORRECTION

PATENT NO. : 6,704,863 B1
DATED : March 9, 2004
INVENTOR(S) : Paul et al.

It is certified that error appears in the above-identified patent and that said Letters Patent is hereby corrected as shown below:

Column 10,
Line 25, please delete "pipe" and substitute therefor -- pipeline --
Line 62, after the phrase "frozen fetch stage and," please insert -- not --.

Column 11,
Line 7, after the phrase "instruction directly into," please insert -- only --.
Line 9, please delete "pipe line" and substitute therefor -- pipeline --.

Signed and Sealed this

Twenty-fourth Day of August, 2004

JON W. DUDAS
*Director of the United States Patent and Trademark Office*